United States Patent [19]

Yamabe et al.

[11] 4,418,186
[45] Nov. 29, 1983

[54] COPOLYMER FOR FLUORINE-CONTAINING ELASTOMER HAVING EXCELLENT LOW TEMPERATURE RESISTANCE AND ALCOHOL RESISTANCE

[75] Inventors: Masaaki Yamabe; Gen Kojima, both of Machida; Hiroshi Wachi; Shun-ichi Kodama, both of Yokohama, all of Japan

[73] Assignee: Asahi Glass Company Ltd., Tokyo, Japan

[21] Appl. No.: 328,387

[22] Filed: Dec. 7, 1981

[30] Foreign Application Priority Data

Dec. 26, 1980 [JP] Japan ............................. 55-183780

[51] Int. Cl.$^3$ ............... C08F 214/16; C08F 214/18; C08F 214/22
[52] U.S. Cl. .................................................. 526/247
[58] Field of Search ........................................ 526/247

[56] References Cited

U.S. PATENT DOCUMENTS

| | | | |
|---|---|---|---|
| 3,136,745 | 6/1964 | Albin et al. | 526/247 |
| 3,450,684 | 6/1969 | Darby | 526/229 |
| 4,035,565 | 7/1977 | Apotheker et al. | 526/247 |
| 4,078,135 | 3/1978 | Sulzbach et al. | 526/247 |
| 4,330,654 | 5/1982 | Ezzell et al. | 526/247 |

Primary Examiner—Harry Wong, Jr.
Attorney, Agent, or Firm—Oblon, Fisher, Spivak, McClelland & Maier

[57] ABSTRACT

A copolymer for a fluorine-containing elastomer having excellent low temperature resistance and alcohol resistance comprises vinylidene fluoride units and fluorovinyl ether units having the formula $CF_2=CFOX$ (X represents a $C_3$–$C_9$ perfluoroalkyl group which has ether bond having 1–3 oxygen atom) at a molar ratio of vinylidene fluoride units to fluorovinyl ether units of 95:5 to 50:50 and at a total content of the units of at least 80 mole %.

4 Claims, No Drawings

COPOLYMER FOR FLUORINE-CONTAINING ELASTOMER HAVING EXCELLENT LOW TEMPERATURE RESISTANCE AND ALCOHOL RESISTANCE

BACKGROUND OF THE INVENTION

1. Field of the Invention

The present invention relates to a novel fluorine-containing copolymer. More particularly, it relates to a copolymer for an elastomer having excellent low temperature resistance and alcohol resistance which comprises specific contents of vinylidene fluoride units and specific fluorovinyl ether units.

2. Description of the Prior Art

It has been considered to utilize alcohol fuel and alcohol-containing fuel because of shortage of petroleum source. Alcohol-containing gasoline as fuel for cars has been practically used in U.S.A. and Brazil. In near future, the change of fuel source will be considered in Japan. In such circumstance, an elastomer having high alcohol resistance as well as high heat resistance, low temperature resistance and oil resistance is needed as an elastomer for cars.

Various known fluorine-containing elastomers have satisfactory heat resistance and oil resistance among these required characteristics. The fluorine-containing elastomer having superior low temperature resistance has not satisfactory alcohol resistance whereas the fluorine-containing elastomer having superior alcohol resistance has not satisfactory low temperature resistance. Any elastomer having entirely satisfactory required characteristics has not been known.

The inventors have studied fluorine-containing elastomers having excellent low temperature resistance and alcohol resistance in the consideration of the aforementioned problems. As a result, it has been found that specific copolymers of vinylidene fluoride and a specific fluorovinyl ether have satisfactory required characteristics.

The present invention has been attained by the finding and is to provide a copolymer for an fluorine-containing elastomer having excellent low temperature resistance and alcohol resistance which comprises vinylidene fluoride units and fluorovinyl ether units having the formula $CF_2=CFOX$ (X represents a $C_3-C_9$ perfluoroalkyl group which has ether bond having 1-3 oxygen atom) at a molar ratio of vinylidene fluoride units to fluorovinyl ether units of 95:5 to 50:50 and at a total content of the units of at least 80 mole %.

In the present invention, it is important to use the fluorovinyl ether having the formula $CF_2CFOX$ wherein X represents a perfluoroalkyl group which has 3–9 preferably 4–6 carbon atoms and ether bond having 1–3 preferably 1–2 oxygen atom.

It is not desired to use a fluorovinyl ether having the formula $CF_2CFOX$ wherein X is a hydrogen-containing group, for example, an alkyl group such as methyl, ethyl and n-butyl group, an alkoxy-alkyl group such as 2-methoxyethyl group, or 2,2,2-trifluoroethyl group, because of inferior heat resistance of the product.

In the case of X which does not include ether bond, if carbon atoms of the monomers are less, the copolymer has not satisfactory alcohol resistance whereas if carbon atoms of the monomers are much enough for improvement of alcohol resistance, the copolymer has inferior low temperature resistance and the copolymer having high molecular weight is not obtained because of inferior polymerization activity.

Suitable perfluorovinyl ethers include perfluoro(2-n-propoxy-propyl vinyl ether)

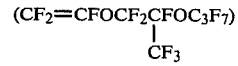

(referring to as PHVE); perfluoro(3-methoxypropyl vinyl ether) $(CF_2=CFO(CF_2)_3OCF_3)$; perfluoro(2-methoxypropyl vinyl ether)$(CF_2=CFOCF_2CF(CF_3)OCF_3)$; perfluoro(2-methoxyethyl vinyl ether) $(CF_2=CFO(CF_2)_2OCF_3)$ and perfluoro (3,6,9-trioxa-5,8-dimethyl dodeca-1-ene)$(CF_2=CFOCF_2CF(CF_3)OCF_2CF(CF_3) OCF_2CF_2CF_3)$. It is especially preferable to use PHVE in view of commercial availability and effect for a low temperature resistance. One or more of the fluorovinyl ethers can be used in the copolymerization.

In the copolymerization of the present invention, it is possible to provide the other comonomer units at a content of up to 20 mole % beside the vinylidene fluoride units and the fluorovinyl ether units.

Such other comonomers can be fluoroolefins, such as tetrafluoroethylene, chlorotrifluoroethylene, vinyl fluoride and hexafluoropropylene; olefins such as ethylene, propylene, isobutylene and butene-1; and vinyl ethers such as perfluoro(propyl vinyl ether), perfluoro(methyl vinyl ether) and ethyl vinyl ether. A copolymer having 15 mole % or less of perfluorovinyl ether units which have perfluoroalkyl group having less carbon atoms such as perfluoro(propyl vinyl ether) has advantageous mechanical characteristics.

It is preferable to incorporate comonomer units for reactive sites in the copolymer of the present invention in order to improve crosslinkability. The comonomer can be perfluoro(2-bromoethyl vinyl ether), 2-chloroethyl vinyl ether, vinyl monochloroacetate etc. In view of copolymerization reactive characteristics, and heat resistance and low temperature resistance of the copolymer and reactivity as cure sites, it is especially preferable to use perfluoro(2-bromoethyl vinyl ether) (hereinafter referring to as BVE). When BVE is used as a comonomer for reactive sites, it is preferable to have the BVE units at about 0.1 to 5 mole % especially about 0.5 to 2.5 mole % in the copolymer. When the content of the BVE units is too small, the effect as cure sites is not satisfactory, whereas when it is too much, the unreacted cure sites are remained in the vulcanized rubber whereby it increases to cause adverse effect to heat resistance and chemical resistance.

In the copolymer of the present invention, it is important to give a molar ratio of vinylidene fluoride units to fluorovinyl ether units of 95:5 to 50:50 preferably 90:10 to 60:40. When the molar ratio of vinylidene fluoride is more than the upper limit, rubber-like elasticity is lost, whereas when it is less than the lower limit, the reactivity for the copolymerization is lower to cause low molecular weight and the mechanical characteristics as the elastomer are inferior.

The copolymer of the present invention can be produced by applying a radical initiation source to a monomer mixture of vinylidene fluoride, the fluorovinyl ether, and, if necessary, the other comonomer. Such copolymerization may be carried out at a high temperature under high pressure, however, it is preferably carried out at a low temperature to obtain a copolymer having high molecular weight. The radical initiation source can be various peroxides or azo type polymerization initiators suitable for low temperature polymerizations as well as an ionized radiation.

The initiators suitable for low temperature polymerizations include organic peroxides such as diisopropylperoxydicarbonate, diethylhexylperoxydicarbonate, acetylcyclohexylsulfonylperoxide, t-butylperoxypivalate, 2,4-dichloro-benzoylperoxide, isobutylperoxide and octanoylperoxide; and azo compounds such as 2,2-azobis(4-methoxy 2,4-dimethylvaleronitrile) and a combination thereof with a desired reducing agent. It is especially preferable to use a redox initiator as a combination of an inorganic peroxide such as a persulfate and a desired reducing agent for example, a highly active redox initiator comprising a persulfate, an iron ion source, ethylenediamine-tetraacetic acid or a salt thereof and a sulfinate.

An amount of the polymerization initiator is decided depending upon a kind of the initiator and a condition for copolymerization and it is usually in a range of 0.005 to 5 weight part especially about 0.01 to 0.5 weight part per 100 weight parts of the total monomers.

The copolymer of the present invention can be produced by a batch, semi-batch or continuous polymerization process. The type of the polymerization can be a bulk polymerization, a solution polymerization or an emulsion polymerization. In view of effective production of a copolymer having high molecular weight, it is preferable to employ an emulsion polymerization.

A temperature in the polymerization is preferably in a range of 80° to −30° C. especially 40° to 0° C. When the polymerization temperature is too high, it is difficult to obtain a copolymer having high molecular weight whereas when it is too low, it causes troubles such as solidification of a medium for polymerization. A pressure in the polymerization can be as in the conventional polymerizations and it can be lower than 150 kg/cm$^2$ especially lower than 100 kg/cm$^2$.

The medium for copolymerization can be selected depending upon the type of the polymerization and it is preferably selected so as to possibly prevent a chain transfer.

The media for polymerization suitable for a solvent polymerization are those having a low chain transfer constant such as t-butanol, methyl acetate and chlorofluorocarbon. However, in view of an effective production of a copolymer having high molecular weight, it is advantageous to employ an emulsion polymerization using an aqueous medium. In view of the acceleration of polymerization and stabilization of latex, it is preferable to employ a mixed medium comprising water and an organic solvent. Suitable organic solvents include t-butanol, methyl acetate and trichlorotrifluoroethane. When an aqueous medium is used, it is possible to add a pH modifier and a buffering agent so as to control pH of the medium depending upon an activity of a polymerization initiator.

The copolymer of the present invention can be identified by an IR spectrum or $^{19}$F-NMR spectrum to observe IR spectrum as characteristic absorptions near 990-1000 cm$^{-1}$ for >CF—O— bond; and $^{19}$F—NMR spectrum in CCl$_3$F base, as peaks at 92-96 ppm and 112-126 ppm for vinylidene fluoride unit (corresponding to —CH$_2$CF$_2$CH$_2$CF$_2$— and —CH$_2$CF$_2$CF$_2$CH$_2$—) and peaks at 120-130 ppm for CF$_2$ and CF of fluorovinyl ether unit.

The copolymer of the present invention is crosslinkable by an ionized radiation or an addition of a curative such as peroxy compounds. It is effective to improve a crosslinkability by a copolymerization with a third comonomer for a reactive site and it is preferable to add a cure promoter such as polyallyl compound.

In the crosslinking process for the copolymer of the present invention, it is possible to incorporate various additives used in the conventional crosslinking process. Suitable additives include metal oxides such as magnesium oxide and lead oxide; metal hydroxides like calcium hydroxide; reinforcing fillers such as carbon balck, fine silica, clay and talc; other fillers; pigments; antioxidants and stabilizers.

When various additives are incorporated into the copolymer of the present invention, it is preferable to uniformly blend them. Such blending is attained by the conventional devices such as a rubber open mill and Banbury mixer. The operation for the blending is not critical. In usual, the additives can be dispersed well into the fluorine-containing copolymer by kneading the mixture at about 30° to 80° C. for about 10 to 60 minutes.

It is also possible to add the additives in a form of a suspension by dissolving and dispersing the additive in a suitable medium. It is also possible to employ a wet blending for blending them in a medium. In the latter process, a suspension can be prepared by using a mixing device such as an open roll, a ball mill and a homogenizer. It is preferable to select the optimum condition and operation in the blending process depending upon kinds of the raw materials and the additives.

The mixture can be fabricated into a form of a sheet, a pipe, a rod, a tube, an angle, a channel, a coated fabric and a coated board by continuous fabrication processes such as an extrusion, a transfer molding process, a roll-coating process, a brush-coating process and a dipping process beside a compression molding process. It is also possible to fabricate it into articles with complexed shape and special molded products such as sponge rubber by various molding and processing processes. The fabricated mixture is vulcanized by a desired vulcanizing means whereby a vulcanized elastomer is obtained from the fluorine-containing copolymer of the present invention.

An elastomer having excellent heat resistance, low temperature resistance, chemical resistance and oil resistance and also excellent alcohol resistance can be obtained from the fluorine-containing copolymer of the present invention. The elastomers can be used for various usages and objects in various fields because of such characteristics, for example, heat resistance-anticorrosive gasket, packing and O-ring; oil resistance sealing material, oil hose, tube and diaphragm; heat resistant-anticorrosive roll; steam resistant gasket; gasket for heat exchanger; and heat resistant-oil resistance electric wire especially parts for cars which contact with alcohol-containing gasoline such as fuel hose, packing and diaphragm.

The present invention will be further illustrated by certain examples and references which are provided for purposes of illustration only and are not intended to be limiting the present invention.

EXAMPLE 1

In a 230 ml. stainless steel autoclave, 75.7 g. of deionized water, 10 g. of t-butanol, 1.0 g. of ammonium persulfate, 2.0 g. of disodium hydrogen-phosphate dodecylhydrate; 0.5 g. of ammonium perfluorononanoate and 4.3 g. of 5% NaOH aqueous solution and 10 g. of a solution obtained by dissolving 0.015 g. of ferrous sulfate heptahydrate, 0.018 g. of EDTA.2Na dihydrate and 43.5 g. of perfluoro(2-n-propoxypropyl vinyl ether) (PHVE) were charged and freezed for deairotion and 6.4 g. of vinylidene fluoride (VDF) was fed. A molar ratio of the charged monomers VDF/PHVE was 50:50.

The autoclave was dipped in a constant temperature water bath at 25° C. and was shaked at a rate of 300 cycle/min. and then, 5% aqueous solution of sodium hydroxymethanesulfinate dihydrate was gradually added under pressure to initiate a polymerization. The pressure drop from the initial pressure of 12 kg/cm$^2$ during the reaction was compensated by compression of VDF so as to maintain the pressure in a range of 12–11 kg/cm$^2$ and the addition of the aqueous solution of sodium hydroxymethanesulfinate was continued. When 3.4 g. of the aqueous solution was added (3 hours after the initiation of the reaction), the autoclave was cooled with ice and the unreacted monomers were purged to stop the reaction. The resulting latex was treated by a freezing agglomeration and the solid product was washed and dried to obtain 33.2 g. of a white sponge elastic copolymer.

According to an elemental analysis, the copolymer had a composition of VDF and PHVE at a molar ratio of VDF:PHVE of 78:22. The copolymer had the inherent viscosity [$\eta$] of 0.56 dl/g. in mixture of trifluorotrichloroethylene and dimethylformamide (90:10) at 30° C. The copolymer had a thermal decomposition temperature (a temperature for initiating a weight loss under heating at a rate of 10° C./min in air; referring to as Td) of 392° C.; a glass transition temperature (a temperature measured by DSC at a rate of 10° C./min.; referring to as Tg) of −31° C.

The copolymer was admixed with triallyl isocyanurate at 4 PHR and MT carbon at 35 PHR by an open roll mill and the blend was pressed at 100° C. to form a sheet having a thickness of 1 mm and the sheet was crosslinked by irradiation of $\gamma$-ray at 4 Mrad from $^{60}$Co source. The physical properties of the crosslinked product are shown in Table 2.

EXAMPLE 2

In accordance with the process of Example 1 except varying the molar ratio of the monomers charged to VDF:PHVE of 80:20 (13.1 g. of VDF and 19.9 g. of PHVE) by feeding VDF under pressure of 10. 5–9.5 kg/cm$^2$ for 2.5 hours, a polymerization was carried out to obtain 28.0 g. of a white sponge elastic copolymer. The copolymer had a composition of VDF:PHVE of 82:18 (molar ratio) and had [$\eta$] of 0.54, Td of 388° C. and Tg of −36° C.

EXAMPLE 3

In accordance with the process of Example 1 except replacing a part of PHVE to perfluoro(n-propyl vinyl ether) (PPVE), at molar ratio of VDF:PHVE:PPVE in charge were 50:40:10 (6.4 g. of VDF; 34.8 g. of PHVE and 5.52 g. of PPVE) a polymerization was carried out under a pressure of 12.0–11.0 kg/cm$^2$ for 2 hours to obtain 26.7 g. of a white sponge elastic copolymer. The copolymer had a composition of VDF, PHVE and PPVE at VDF:PHVE:PPVE of 76:16:8 (molar ratio) and had [$\eta$] of 0.75, Td of 406° C. and Tg of −29° C.

In accordance with the process of Example 1, the resulting copolymer was crosslinked. The physical properties of the crosslinked product are shown in Table 2.

EXAMPLE 4

In a 1 liter stainless steel autoclave, 547 g. of deionized water, 72 g. of t-butanol, 7.2 g. of ammonium persulfate, 14.4 g. of disodium hydrogen-phosphate dodecylhydrate, 3.6 g. of ammonium perfluorononanoate and 31 g. of 5% NaOH aqueous solution were charged. An aqueous solution of 0.11 g. of ferrous sulfate heptahydrate and 0.13 g. of EDTA.2Na.dihydrate in 72 g. of water was charged. The autoclave was cooled with ice water. Nitrogen compression at 5 kg/cm$^2$ and purge were repeated for three times and the autoclave was evacuated by a vacuum pump and 67.6 g. of vinylidene fluoride and 99.1 g. of perfluoro(2-n-propoxypropyl vinyl ether)(PHVE) and 5.1 g. of perfluoro-(2-bromoethyl vinyl ether)(BVE) were charged. The autoclave was heated at 25° C. and 1.15% of an aqueous solution of disodium hydroxymethanesulfinate was gradually added under pressure to intiate the polymerization. As the process of Example 1, the pressure in the polymerization was maintained in a range of 23–22 kg/cm$^2$ by additionally feeding the monomers at molar ratios of VDF:PHVE:BVE of 81:17.6:1.4. After 4.33 hours, the feeding of the aqueous solution of disodium hydroxymethanesulfinate and the monomers was stopped and the unreacted monomers were purged to stop the reaction. During the additional feeding, the amounts of the charged components were respectively 10 g. of the aqueous solution of disodium hydroxymethanesulfinate, 108.2 g. of VDF, 158.6 g. of PHVE and 8.1 g. of BVE.

The resulting copolymer was agglomerated by adding 10% aqueous solution of sodium chloride to the resulting latex and was washed and dried to obtain 214 g. of white sponge elastomer. The physical properties of the copolymer were measured as set forth in Example 1. The copolymer had [$\eta$] of 2.01 g, Tg of −35° C. and Td of 400° C.

According to $^{19}$F-NMR analysis, the copolymer had a composition of VDF, PHVE and BVE at molar ratios of VDF:PHVE:BVE of 83.3:15.3:1.4.

The copolymer was admixed with Perhexa 2,5 B (Nippon Oil & Fat Co.) at 1 PHR, triallyl isocyanurate at 1 PHR, calcium hydroxide at 5 PHR and SRF-carbon at 35 PHR by an open roll mill. The blend was treated by a press-vulcanization at 170° C. for 15 minutes and an oven-vulcanization at 200° C. for 3 hours to obtain a vulcanized sheet having a size of 1 mm×10 cm×6 cm. The physical properties of the vulcanized product are shown in Table 2.

EXAMPLES 5 to 8

In accordance with the process of Example 4 except varying amounts of the initially charged monomers and the additionally charged monomers, each copolymer was produced. The yields, compositions and physical properties of the resulting copolymers are shown in Table 1.

The physical properties of the vulcanized products obtained by the process set forth in Example 4 are shown in Table 2.

TABLE 1

| | | Example No. | | | |
|---|---|---|---|---|---|
| | | 5 | 6 | 7 | 8 |
| Initial | VDF | 65.9 | 65.9 | 65.9 | 44.0 |
| Charge | PHVE | 110.4 | 107.0 | 112.6 | 141.9 |

TABLE 1-continued

|  |  | Example No. | | | |
|---|---|---|---|---|---|
|  |  | 5 | 6 | 7 | 8 |
| (g) | BVE | 5.1 | 7.2 | 3.6 | 4.8 |
| Additional | VDF | 105.5 | 105.5 | 105.5 | 36.6 |
| Charge | PHVE | 176.6 | 171.2 | 180.2 | 54.4 |
| (g) | BVE | 8.1 | 11.4 | 5.7 | 3.1 |
| Pressure (kg/cm$^2$) | | 23 | 23 | 23 | 15 |
| Polymer Yield (g) | | 257 | 245 | 253 | 171 |
| Polymer | VDF | 80.8 | 80.5 | 80.7 | 71.3 |
| Composition | PHVE | 17.9 | 17.5 | 19.4 | 27.3 |
| (mole %) | BVE | 1.3 | 2.0 | 0.9 | 1.4 |
| [η] | | 2.00 | 1.85 | 2.13 | 1.77 |
| Td (°C.) | | 405 | 397 | 412 | 395 |
| Tg (°C.) | | −35 | −34 | −35 | −32 |

EXAMPLE 9

In accordance with the process of Example 4 except using 70.2 g. of t-butanol and 1.8 g. of sec-butanol instead of 72 g. of t-butanol, a copolymer was produced. The yield of the copolymer was 206 g. and the copolymer had a composition of VDF, PHVE and BVE at molar ratios of VDF:PHVE:BVE of 82.9:15.7:1.4. The copolymer had [η] of 0.91, Tg of −35° C. and Td of 390° C.

The physical properties of the vulcanized product obtained by the process set forth in Example 4 are shown in Table 2.

EXAMPLE 10

In accordance with the process of Example 4 except using perfluoro(3,6,9-trioxa-5,8-dimethyl dodeca-1-en) (PUVE) instead of PHVE as the fluorovinyl ether at ratios of initially charged monomers of VDF:PUVE:BVE of 67.6:137.2:5.1 (g.) and ratios of additionally charged monomers of VDF:PUVE:BVE of 108.2:219.5:8.1 (g.), a copolymer was produced. The yield of the copolymer was 327.4 g. and the copolymer had a composition of VDF, PUVE and BVE at molar ratios of VDF:PUVE:BVE of 83.5:15.1:1.4. The copolymer had [η] of 1.90, Tg of −38° C. and Td of 403° C.

The physical properties of the vulcanized product obtained by the process set forth in Example 4 are shown in Table 2.

EXAMPLE 11

In accordance with the process of Example 4 except substituting a part of PHVE with PPVE at ratios of initially charged monomers of VDF:PHVE:PPVE:BVE of 67.6:49.5:30.5:5.1 (g.) and ratios of additionally charged monomers of VDF:PHVE:PPVE:BVE of 108.2:79.3:48.8:8.1 (g.), a copolymer was produced. The yield of the copolymer was 185.0 g. and the copolymer had a composition of VDF, PHVE, PPVE and BVE at molar ratios of 82.0:8.0:8.6:1.4. The copolymer had [η] of 2.09, Tg of −27° C. and Td of 405° C.

The physical properties of the vulcanized product obtained by the process set forth in Example 4 are shown in Table 2.

TABLE 2

|  | Example No. | | | | | | | | | |
|---|---|---|---|---|---|---|---|---|---|---|
|  | 1 | 3 | 4 | 5 | 6 | 7 | 8 | 9 | 10 | 11 |
| Tensile strength (T.S.) (kg/cm$^2$) | 54 | 82 | 160 | 142 | 135 | 132 | 117 | 140 | 152 | 165 |
| Elongation (El.) (%) | 180 | 187 | 247 | 234 | 200 | 260 | 232 | 210 | 235 | 242 |
| Hardness [JIS-A] | 76 | 78 | 70 | 64 | 66 | 63 | 67 | 67 | 64 | 70 |
| After Aging T.S. at 200° C. (kg/cm$^2$) | 55 | 85 | 158 | 140 | 137 | 125 | 110 | 135 | 140 | 169 |
| for 30 Days El. (%) | 190 | 180 | 255 | 240 | 205 | 280 | 230 | 225 | 246 | 250 |
| Temperature Retraction [TR-10] (°C.) | −24 | −21 | −32 | −31 | −30 | −32 | −32 | −32 | −36 | −22 |
| Oil Resistance$^{(a)}$ (%) | 6.2 | 6.7 | 8.3 | 6.8 | 6.5 | 7.4 | 6.8 | 7.8 | 5.9 | 7.2 |
| Methanol Resistance$^{(b)}$ (%) | 20 | 28 | 22 | 25 | 21 | 25 | 25 | 27 | 20 | 24 |

$^{(a)}$Volume swell after immersion in Fuel B at room temperature for 7 days.
$^{(b)}$Volume swell after immersion in methanol at 40° C. for 3 days.

We claim:

1. A copolymer for a fluorine-containing elastomer having excellent low temperature resistance and alcohol resistance which comprises vinylidene fluoride units and fluorovinyl ether units having the formula CF$_2$=CFOX, wherein x is a C$_3$-C$_9$ perfluoralkyl group which has an ether bond or bonds having 1-3 oxygen atoms, at a molar ratio of said vinylidene fluoride units to said fluorovinyl ether units of 90:10 to 60:40 and at a total content of the units of at least 80 mole %; and perfluoro(2-bromoethyl vinyl ether) units at 0.1 to 5 mole %, based on the total copolymer.

2. A copolymer for a fluorine-containing elastomer having excellent low temperature resistance and alcohol resistance which comprises vinylidene fluoride units and perfluoro(2-n-propoxypropyl vinyl ether) units, at a molar ratio of said vinylidene fluoride units to said perfluoro(2-n-propoxypropyl vinyl ether) units of 90:10 to 60:40 and at a total content of the units of at least 80 mole %; and perfluoro(2-bromoethyl vinyl ether) units at 0.1 to 5 mole %, based on the total copolymer.

3. A copolymer for a fluorine-containing elastomer having excellent low temperature resistance and alcohol resistance which comprises vinylidene fluoride units and perfluoro(2-n-propoxypropyl vinyl ether) units, at a molar ratio of said vinylidene fluoride units to said perfluoro(2-n-propoxypropyl vinyl ether) units of 90:10 to 60:40 and at a total content of the units of at least 80 mole %, and perfluoro(propylvinyl ether) units, of 15 mole % or less, based on the total copolymer.

4. The copolymer according to claim 3, which further comprises perfluoro(2-bromoethyl vinyl ether) units at 0.1 to 5 mole %, based on the total copolymer.

* * * * *